United States Patent
Ahlstrom et al.

(10) Patent No.: US 6,211,589 B1
(45) Date of Patent: *Apr. 3, 2001

(54) MAGNETIC SYSTEMS FOR ENERGY STORAGE FLYWHEELS

(75) Inventors: Harlow G. Ahlstrom, Maple Valley; John R. Barton, Kent; Thomas S. Luhman, Bellevue; Michael Strasik, Issaquah; Michael Chapman, Federal Way; Darryl F. Garrigus, Issaquah, all of WA (US)

(73) Assignee: The Boeing Company, Seattle, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/338,223

(22) Filed: Jun. 22, 1999

Related U.S. Application Data (62) Division of application No. 08/476,797, filed on Jun. 7, 1995.

(51) Int. Cl.⁷ ............................. H02K 1/27; H02K 7/09
(52) U.S. Cl. .................... 310/74; 310/90.5; 310/156; 310/266; 74/572
(58) Field of Search ..................... 310/90.5, 74, 266, 310/261, 156, 254; 74/572, 573 R, 573 F; 300/268

(56) References Cited

U.S. PATENT DOCUMENTS 2,623,187 12/1952 Adams ................................ 310/154
3,312,846 4/1967 Henry-Baudot ..................... 310/266

(List continued on next page.)

OTHER PUBLICATIONS

K. Sawano et al., "High Magnetic Flux Trapping by Melt–Grown YBaCuO Superconductors," *Japanese Journal of Applied Physics*, vol. 30, No. 7A, Jul. 1991, pp. L1157–L1159.

(List continued on next page.)

*Primary Examiner*—Burton Mullins
(74) *Attorney, Agent, or Firm*—Christensen O'Connor; Johnson Kindness PLLC (57) ABSTRACT

A flywheel system suitable for storing energy when demand for energy from a power plant is low, and from which energy can be retrieved when energy demand increases. The flywheel includes (a) a circular composite or metallic glass ring with a radial width limited to less than about 30 percent of the ring's outer radius, and (b) at least one spoke extending along a diameter of the ring, and attached to the ring at either end. The spoke has sufficient radial extendability due to either bending and elastic radial elongation, or only elastic elongation so that, when the flywheel rotates at operating speed, the spoke extends radially to match the radial growth of the ring, without subjecting the flywheel to significant tension at points of attachment of the spoke to the ring. In one embodiment, both flywheel ring and spoke are made of oriented high strength fibers embedded in a thermoplastic resin. Also provided are a magnetic bearing and motor/generator system that are of an axial-gap design so that magnets are held in a substantially fixed position relative to each other, as the flywheel expands radially under centrifugal forces. Further, both motor/generator and flywheel bearings utilize a system of permanent magnets alternating with a high magnetic permeability composition in order to produce highly uniform magnetic fields in the bearing to reduce magnetic drag and improve efficiency, and to produce high torque in the motor generator. The flywheel bearing assembly includes a bulk high temperature superconductive magnet that provides lateral stability to the flywheel.

18 Claims, 8 Drawing Sheets

U.S. PATENT DOCUMENTS

| | | | |
|---|---|---|---|
| 3,673,444 | 6/1972 | Kawabe et al. | 310/10 |
| 3,762,042 | 10/1973 | Abe et al. | 29/598 |
| 3,859,868 | 1/1975 | Post | 74/572 |
| 4,028,962 | 6/1977 | Nelson | 74/572 |
| 4,052,913 | 10/1977 | Schultz et al. | 74/572 |
| 4,072,370 | 2/1978 | Wasson | 310/90.5 |
| 4,077,678 | 3/1978 | Studer et al. | 310/90.5 |
| 4,123,949 | 11/1978 | Knight, Jr. et al. | 74/572 |
| 4,186,245 | 1/1980 | Gilman | 428/635 |
| 4,186,623 | 2/1980 | Friedericy et al. | 74/572 |
| 4,198,878 | 4/1980 | Lewis et al. | 74/572 |
| 4,207,778 | 6/1980 | Hatch | 74/572 |
| 4,266,442 | 5/1981 | Zorzi | 74/572 |
| 4,285,251 | 8/1981 | Swartout | 74/572 |
| 4,339,874 | 7/1982 | McCarty et al. | 29/598 |
| 4,341,001 * | 7/1982 | Swartout | 310/105 R |
| 4,370,899 | 2/1983 | Swartout | 74/572 |
| 4,371,801 | 2/1983 | Richter | 310/156 |
| 4,408,500 | 10/1983 | Kulkarni et al. | 74/572 |
| 4,470,644 | 9/1984 | Weisser | 310/90.5 |
| 4,481,840 * | 11/1984 | Friedericy et al. | 74/572 |
| 4,556,828 | 12/1985 | Thompson | 318/254 |
| 4,589,707 * | 5/1986 | Caye et al. | 310/74 |
| 4,660,435 | 4/1987 | Davis et al. | 74/572 |
| 4,668,885 | 5/1987 | Scheller | 310/90.5 |
| 4,726,926 | 2/1988 | Siemers et al. | 376/439 |
| 4,730,154 | 3/1988 | Pinson | 322/4 |
| 4,735,382 | 4/1988 | Pinson | 244/150 |
| 4,817,453 | 4/1989 | Breslich, Jr. et al. | 74/572 |
| 4,860,611 | 8/1989 | Flanagan et al. | 74/574 |
| 4,926,107 | 5/1990 | Pinson | 322/4 |
| 5,012,216 | 4/1991 | Jin | 335/216 |
| 5,079,461 | 1/1992 | Schlüter et al. | 310/67 A |
| 5,126,317 | 6/1992 | Agarwala | 505/166 |
| 5,159,219 | 10/1992 | Chu et al. | 310/90.5 |
| 5,177,387 * | 1/1993 | McMichael et al. | 310/90.5 |
| 5,209,461 | 5/1993 | Whightsil, Sr. | 267/155 |
| 5,218,250 | 6/1993 | Nakgawa | 310/12 |
| 5,245,238 | 9/1993 | Lynch et al. | 322/4 |
| 5,245,270 | 9/1993 | Akiyama | 310/116 |
| 5,285,699 | 2/1994 | Walls et al. | 74/572 |
| 5,302,874 * | 4/1994 | Pinkerton | 310/90.5 |
| 5,313,130 * | 5/1994 | Shibayama et al. | 310/90.5 |
| 5,332,971 * | 7/1994 | Aubert | 324/319 |
| 5,334,899 | 8/1994 | Skybyk | 310/268 |
| 5,396,140 | 3/1995 | Goldie et al. | 310/268 |
| 5,398,571 | 3/1995 | Lewis | 74/572 |
| 5,436,516 | 7/1995 | Yamazaki et al. | 310/90.5 |
| 5,513,498 | 5/1996 | Ackermann et al. | 62/51.1 |
| 5,514,923 | 5/1996 | Gossler et al. | 310/74 |
| 5,521,448 * | 5/1996 | Tecza et al. | 310/90.5 |
| 5,563,564 | 10/1996 | Chu et al. | 335/216 |
| 5,563,565 | 10/1996 | Hull | 335/216 |
| 5,625,241 | 4/1997 | Ewing et al. | 310/156 |

OTHER PUBLICATIONS

M. Morita et al., "Magnets Made of QMG Crystals," Abstract from Advanced Materials & Technology Research Laboratories, Nippon Steel Corp.,Kanagawa, Japan, undated.

T. Sasaki et al., Magnetic Shielding by Superconducting Y–Ba–Cu–O Prepared by the Modified Quench and Melt Growth (QMG) Process, *Japanese Journal of Applied Physics*, vol. 31, (1992) pp. 1026–1032.

* cited by examiner

MAGNETIC SYSTEMS FOR ENERGY STORAGE FLYWHEELS

RELATED APPLICATIONS

This application is a divisional of U.S. patent application Ser. No. 08/476,797 filed Jun. 7, 1995.

FIELD OF THE INVENTION

The invention relates to a flywheel system suitable for storing energy when demand for energy is low, and from which energy can be retrieved when energy demand increases. In addition, the invention relates to systems for maintaining power quality and providing uninterruptable power sources. More particularly, the invention relates to magnetic bearings and motor/generators for use with energy storage flywheels.

BACKGROUND OF THE INVENTION

In general, power generation equipment operates most efficiently under steady-state conditions that allow design engineers to optimize operating conditions. To the extent that power generation equipment operates outside these optimum design conditions, energy efficiency generally declines. For example, if a power plant must be turned down to produce a lower amount of power, then flue gas energy recovery systems may become less efficient, resulting in an overall decrease in conversion of energy to useful electrical energy. On the other hand, when a power generating plant operates at above its designed capacity, inefficiencies may result from factors such as incomplete combustion and the inability of energy recovery systems to recover a high proportion of incremental heat produced.

Although energy-efficient operation of power generation equipment requires a steady-state load, demand for power varies cyclically throughout a day, and also varies seasonally. Thus, it is not often feasible to operate power plants at optimum levels of efficiency, since exactly corresponding demand does not occur for any great length of time. Energy generation systems are also subject to faults, which cause voltage and phase changes and outages, which are not acceptable to many users. These users must have an assurance of power quality and/or an auxiliary energy storage or generation system to prevent outages.

Efforts have been made to "smooth" the demand for energy from power plants to facilitate steady-state power generation equipment operation. Some of these efforts have focused on auxiliary power generation equipment that may be operated when demand is high and shut down, or "turned down", when demand is low. These auxiliary units are not only expensive but are usually also inefficient, since they also do not operate at their optimum load levels but at varying levels, depending upon demand. Other efforts have focused on energy storage. Examples of such energy storage systems include, for example, the use of batteries to store electricity or the use of pumped storage systems. The pumped systems utilize excess power generated during low power demand periods to pump water to an elevated storage position, thereby imparting potential energy to the water. When demand for energy increases, the water is released from storage and flows to a lower elevation, releasing potential energy, which is typically converted, via turbines, to kinetic energy and subsequently to electricity.

It has also been proposed that excess energy could be stored in large flywheels that are caused to rotate at very high speeds, thereby storing energy as kinetic energy. However, these flywheel energy storage concepts present several challenging issues. A flywheel that rotates on a mechanical bearing will generally suffer relatively high energy losses due to bearing friction. Thus, the ratio of output energy from the flywheel to input energy (a measure of overall efficiency) is often relatively low so that such systems are usually commercially unattractive.

Magnetic bearings have been proposed for a variety of flywheel designs. However, these bearings also suffer significant drawbacks. Permanent or electromagnets do not provide lateral stabilizing forces to hold a rotating flywheel in position. Thus, electromagnets with complex and low efficiency servosystems are required for lateral stability. Also, magnets in a motor/generator are often arranged so that, when the wheel rotates at high speed and components undergo radial expansion, the gap between the magnets and the field coils increases, thereby decreasing efficiency—an undesirable effect.

Also, a flywheel rotating at high speed generates high radial and hoop stresses in the wheel structure. And, the higher the rate of rotation, the greater these forces become. At some point, hoop stresses, which exceed radial stresses, may cause a failure of wheel materials with potentially devastating results. To avoid this eventuality, expensive high strength materials must be used. This high cost discourages the use of flywheels, since it is desirable to use a lowest cost method of energy storage.

A flywheel that is used to store energy may be expected to rotate within a normal operating range of frequencies or rotational speeds related to the highest and lowest amounts of energy stored. Generally, it is undesirable that the flywheel have a critical frequency, which sets up a resonance condition, within this operating range of speeds. However, materials and mechanical designs frequently make it difficult, if not impossible, to entirely eliminate critical frequencies within the normal operating range of the flywheel. This impairs the operating flexibility of the flywheel since it is undesirable to operate through the critical frequency as a normal condition of use.

In order for flywheels to become commercially attractive for use as energy storage devices, the flywheels must be relatively inexpensive to produce, able to store a commercially useful amount of energy, without risk of self-destruction due to radial or hoop stresses, must have a critical frequency that is outside the range of operating conditions, and should have efficient bearings and motor/generators to minimize energy losses.

SUMMARY OF THE INVENTION

The invention provides a flywheel system for storage of energy from a power source during periods of low energy demand and subsequent discharge of this energy during periods of greater energy demand. The flywheel can also be used to provide a local source of energy during a supply outage, thereby ensuring an uninterruptable power source, or as a power quality device to maintain voltage and phase stability.

The flywheel of the system includes a circular composite ring having a radial width limited to a proportion of the radius of the ring to reduce internal radial stresses to below the transverse capability of the circumferentially wound high strength fibers. Thus, preferably the radial width is less than about 30% of the outside radius of the ring. The composite material of the ring includes circumferentially wound unidirectionally high strength fibers consolidated together in a matrix of thermoplastic resin. Because the ring is circumferentially wound, the high strength fibers are oriented to counteract hoop stresses that act on the ring when the flywheel rotates. High strength to weight metallic glass is an attractive alternative material for the flywheel.

The flywheel ring is supported by at least one spoke that extends along a diameter of the ring, one end of the spoke being fixedly attached to a location on the ring, and the other end of the spoke fixedly attached to a diametrically opposite location on the ring. The spokes of the ring are also fabricated from a composite that can include high strength fibers, a substantial proportion of which are aligned along a longitudinal axis of the spoke, that are consolidated together in a matrix of a thermoplastic resin. When the spokes are attached to the ring, the spokes are configured to have a degree of flexibility such that, when the flywheel rotates at increasing speed, and the ring is caused to expand radially outward under centrifugal force, the spokes grow radially to match the growth of the ring, without subjecting the ring to significant radial force at points of spoke attachment to the ring. Radial growth of the spoke is achieved under the action of centrifugal forces by a combination of bending deformation of the spoke, as it straightens from its initial "drooped" static configuration into a more nearly planar radial configuration, and axial elongation of the spoke. Alternatively, the spokes are made of a material that elongates elastically under centrifugal forces, thereby minimizing radial force at points of attachment to the ring.

Importantly, the preferred magnetic bearings and motor/generators of the invention have an axial gap between arrays of opposed magnets so that, when the flywheel operates and undergoes radial expansion, arrays of magnets do not become further displaced but remain in substantially fixed position relative to each other. This enhances the efficiencies of both the bearing and motor/generator.

The invention provides a motor/generator hub that is enclosed by first and second cooperating housing portions. The upper or first housing portion has formed therein a first circular trough, wherein is disposed a first circular array of wedge-shaped permanent magnets, preferably alternating with wedge-shaped bodies of high magnetic permeability material. The magnets are each polarized to produce a magnetic field from poles on horizontally opposed (i.e., top and bottom) sides. Each of the vertical opposed sides interfaces with a side of one of the wedges of high permeability material. The lower or second housing portion has a second circular array of wedge-shaped permanent magnets, preferably alternating with wedge-shaped bodies of high magnetic permeability material, contained in a second circular trough. The magnets are polarized to produce a magnetic field from poles on horizontal opposite (i.e., top and bottom) sides. Vertical opposing sides of the magnets each interface with a wedge of high permeability material. When the first and second housing portions are cooperatively engaged, the first magnet array is located directly above the second array, with an axial gap between the arrays, so that a cooperating magnetic field formed between facing magnets of opposite polarity extends into the gap. A plurality of coils of electrically conductive wire are disposed in the axial gap. The coils are each radially connected to a central hub that is directly connected to an end of a drive shaft, which passes through the upper housing portion.

In certain embodiments, the first and second circular arrays of the motor/generator hub may be made up entirely of circular arrays of wedge-shaped permanent magnets, without alternating bodies of high magnetic permeability material.

The invention further provides a magnetic bearing system that provides virtually "friction-free" stable operation by providing azimuthally uniform fields from both magnets of a rotatable hub and magnets of a stationary support so that a higher proportion of input energy, converted to kinetic energy when the rate of rotation of the flywheel is increased, may be recovered through a motor/generator of the invention as electrical energy.

The invention provides a magnetic bearing assembly that includes a cylindrical stationary support and a cooperating cylindrical rotatable bearing hub that is levitated above the stationary support by repulsive interaction of magnetic fields. The stationary support includes a plurality of bulk superconductive magnets fixedly arrayed in a circular trough, preferably close to the outer circumference of the stationary support. The stationary support also includes at least one permanently magnetized ring fixedly held in a second circular trough, concentric with the first circular trough of the support. The permanently magnetized ring is made up of a circular array of wedge-shaped magnetic segments. The rotatable bearing hub has an upper surface adapted for attachment to spokes of a flywheel, and an undersurface that has at least two circular troughs containing permanently magnetized rings, each likewise made up of a circular array of wedge-shaped magnets. When the magnetic bearing is assembled, the magnetic rings of the hub align vertically above the magnetic rings of the stationary support so that repulsive interaction of the magnetic fields of permanent magnets of the stationary support and the bearing hub cause the flywheel to levitate. Further, interaction of the magnetic field of the bulk superconductive magnets of the stationary support and magnetic fields of bearing hub magnets stabilize the flywheel laterally when the flywheel rotates at speed.

In another embodiment of the invention, the stationary support includes a plurality of alternating concentric permanently magnetized rings and rings of a high magnetic permeability material, disposed in touching relationship. The same alternating ring construction is also substituted for the permanently magnetized ring of the rotatable hub.

The invention also provides a device and continuous method for making composite flywheels efficiently and relatively inexpensively. The device unwinds tape that is made of longitudinally oriented fiber impregnated with a thermoplastic resin from a tape supply spool and winds the tape around a circumference of a mandrel. As the tape is wound from the spool onto the mandrel, the tape is heated by a hot roller or other means to cause the thermoplastic resin to soften. The heat-softened tape is then wound and pressed onto the mandrel to consolidate it with tape already consolidated on the mandrel to form a composite ring. After pressing and consolidation, the outer surface of the composite is cooled below the glass transition temperature of the resin by contact with a cooling roller or other means.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
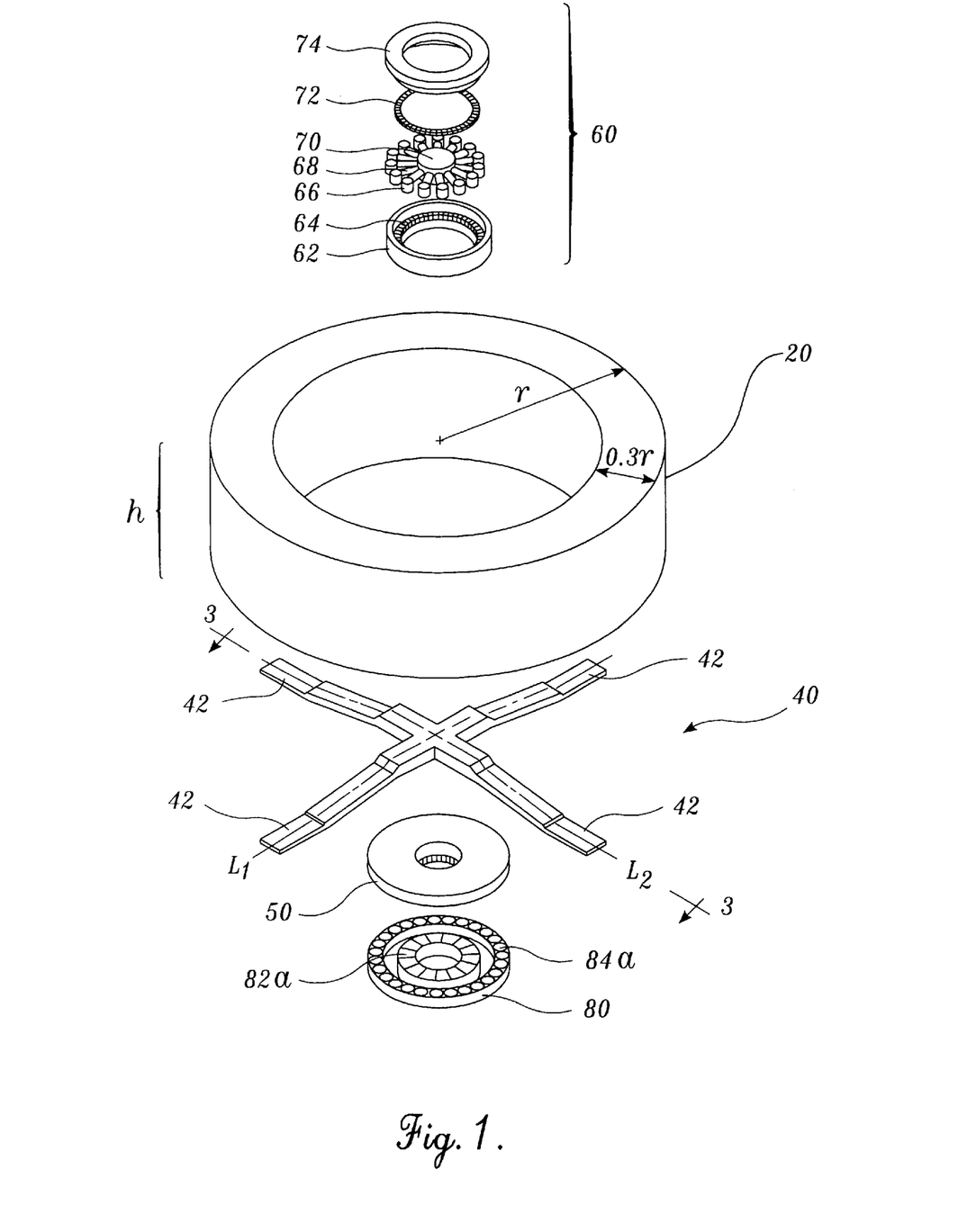
FIG. 1 is an exploded schematic of an embodiment of the flywheel system of the invention.

In one of the embodiments illustrated in FIG. 1, the invention provides a flywheel energy storage system that includes a circular ring 20 having a radial width w that is less than or equal to about 0.3 r, where r is the outer radius of the ring. The flywheel ring 20 has a vertical height or thickness h and is fabricated from a thermoplastic resin composite material, or other high strength to weight materials, such as advanced metallic glass. As used in the specification and clams, "high strength to weight material" means a material that is capable of a stored energy density, when made into a flywheel, of greater than about 100 watt-hours/Kg, preferably greater than about 150 watt-hours/Kg. The composite is preferably made up of a consolidated laminate of circumferentially wound plies or strips of thermoplastic resin-impregnated fibrous tow or tape. The fibers of the material are aligned parallel to each other and to the longitudinal axis of the ply. Thus, the fibers of the consolidated composite flywheel spiral outward around the ring. And, since the ply is very thin, each turn of the fibers about the ring is aligned substantially circumferentially, or substantially concentric with the circumference of the ring. This fiber orientation is preferred because hoop stresses also act circumferentially on a rotating flywheel. Thus, the fiber orientation counteracts these stresses, thereby allowing higher rates of rotation of the flywheel and hence higher energy storage capability.

The fibers of the tape may be selected from those high strength fibers that, when consolidated with a thermoplastic resin into a ring, are able to withstand hoop stresses of the magnitude generated by a flywheel at its maximum operating velocity. With appropriate design factors of safety and materials, these can range from 100,000 psi to 500,000 psi. Examples of such fibers include graphite fiber, glass fiber, high density polyethylene fiber, and high strength aramid fiber, such as KEVLAR® fiber (a trademark of DuPont of Wilmington, Del.). The thermoplastic polymeric composition must be compatible with the fiber selected so that a consolidated composite of circumferentially wound fibers within a thermoplastic matrix may be formed. Examples of thermoplastic resins useful in accordance with the invention include polysulfone, polyetheretherketone, polyetherketoneketone, and polyetherimide.

The flywheel of the invention has at least one composite spoke, and is preferably equipped with a pair of composite spokes 40 at right angles to each other, as shown in FIG. 1.

In this embodiment, the spokes are designed so that end portions 42 cooperate with the underside of ring 20 and are attached to ring 20 by an adhesive. The spokes 40 have sufficient flexibility (i.e., they droop when the flywheel is at rest) so that when the composite ring 20 rotates, and centrifugal forces expand the radius of the ring, the supporting spokes 40 extend from a drooped rest condition to more planar conditions so that radial extension of the spokes matches the growth of the ring. In general, radial growth of the spoke is achieved under the action of centrifugal forges by a combination of bending deformation of the spoke as it straightens from its initial "drooped" rest configuration into a more nearly planar radial configuration, and also axial elongation of the spoke. In certain embodiments, the drooped spoke configuration may be replaced by spokes that extend radially by elastic elongation of the spokes under applied centrifugal forces. As a result, the points of attachment between spoke ends 42 and ring 20 are not placed under tensile stress. Thus, the ring is not subject to radial expansion-restraining stresses that minimize the amount of energy that can be stored.

Figure 3:
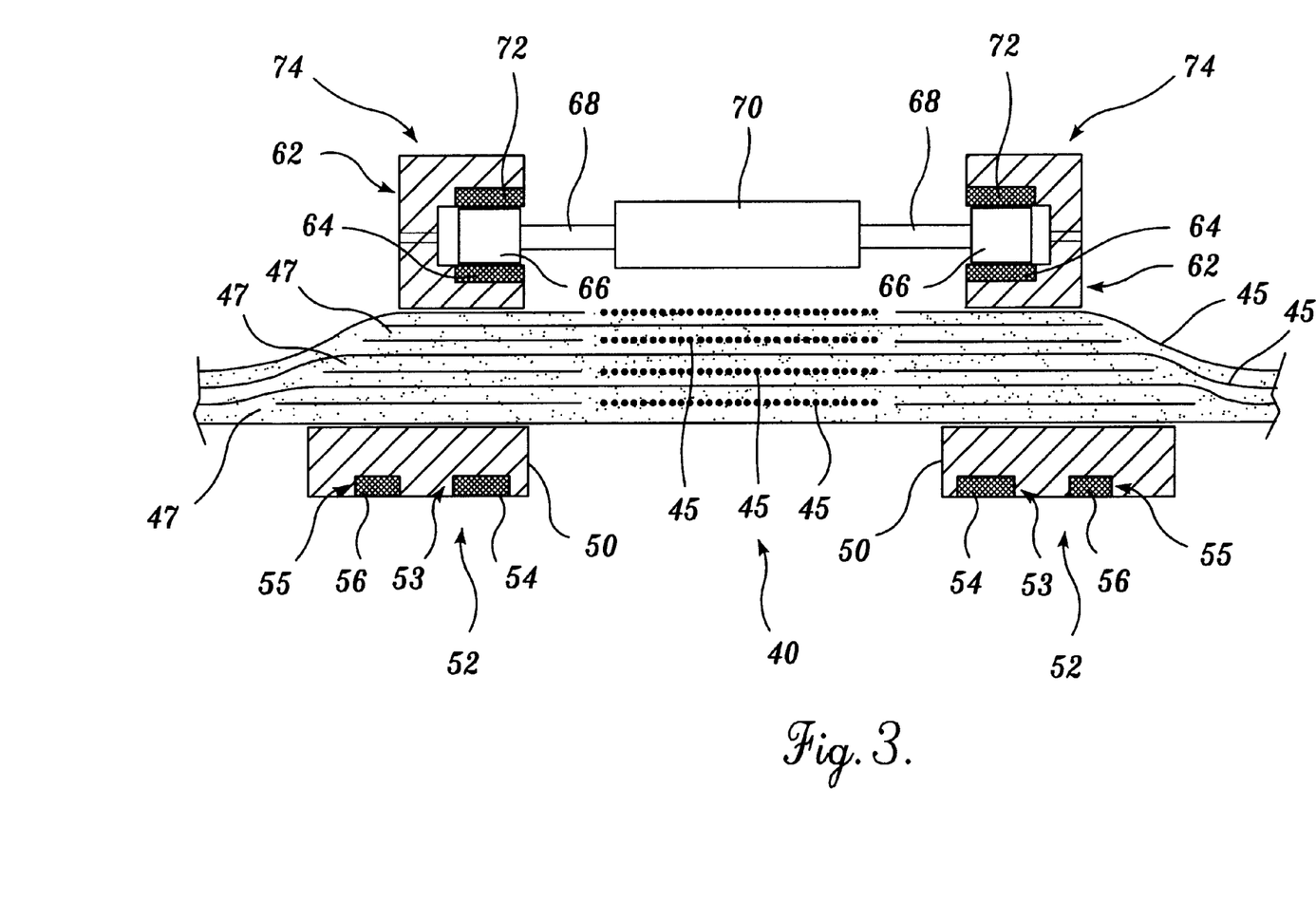
FIG. 3 is a schematic cross-sectional view of an embodiment of the spokes, magnetic bearing hub and motor/generator hub of the inventive flywheel system.

Preferably, the composite spokes are also fabricated from a composite material that includes high strength fibers 45 oriented primarily parallel to longitudinal axes $L_1$ and $L_2$ of each of the spokes, as shown in FIG. 3, a schematic cross-sectional view taken along $L_1$, which also shows the juxtaposition of the motor/generator and magnetic bearing relative to the spokes when the flywheel system is assembled. The fibers 45 are preferably embedded in a thermoplastic resin matrix 47. Thus, as the flywheel rotates and the spokes grow radially, any radial tensile stress applied to the spokes will be primarily in a direction parallel to the fibers, so that the fibers are optimally able to counteract the stress.

Figure 2:
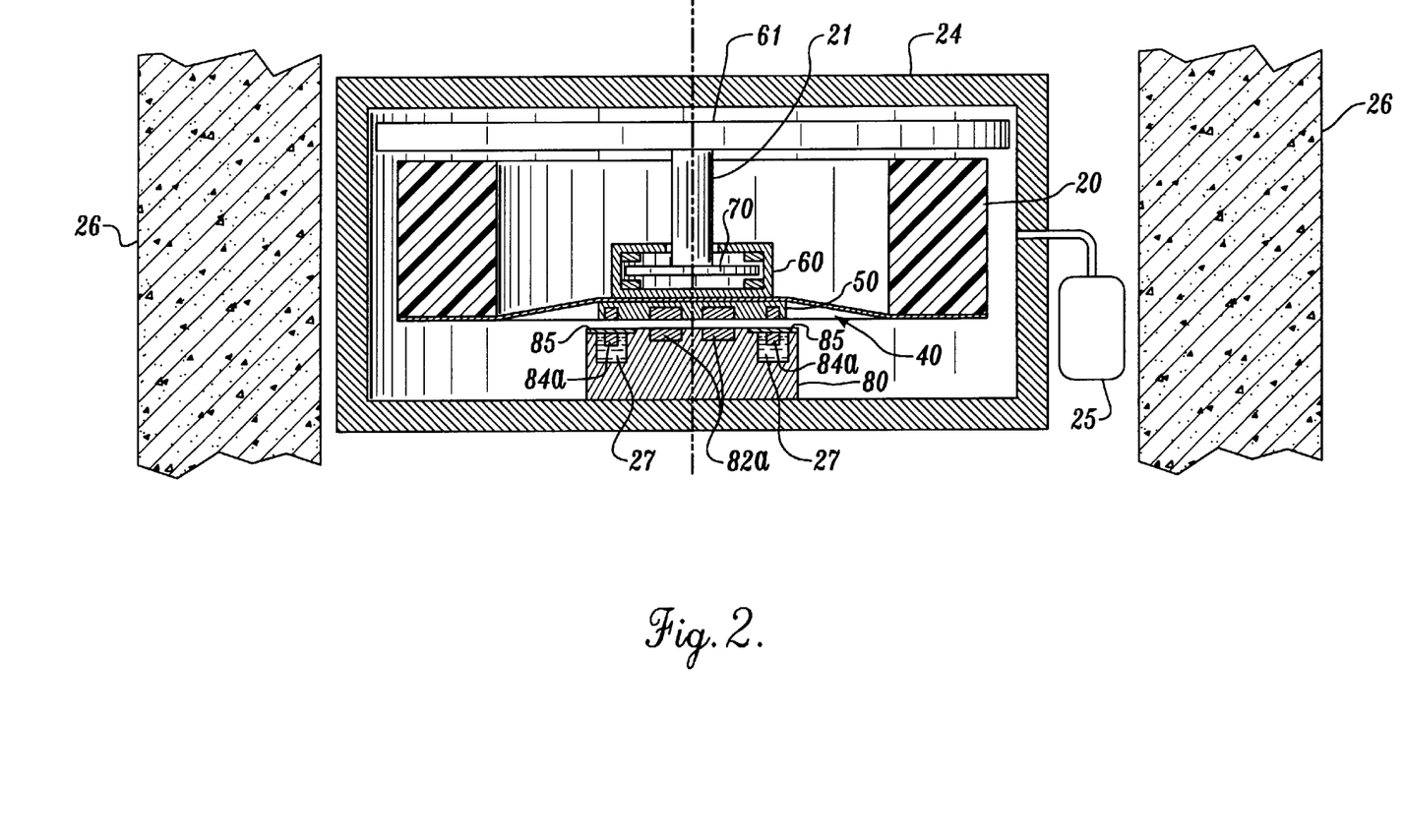
FIG. 2 is a schematic diagram showing an embodiment of the flywheel system and its surrounding protective structure, in accordance with the invention.

In order to ensure safety and in order to reduce friction losses, the flywheel assembly, including stationary support and motor/generator, are preferably surrounded by a vacuum chamber 24, as shown in FIG. 2. This surrounding chamber allows the pulling of a vacuum, with vacuum equipment 25 in fluid communication with the chamber interior, around the rotating flywheel 20 to eliminate drag that would be caused by surrounding air. Thus, energy losses are minimized. Also, heat generation due to friction losses is reduced. This is an important consideration since superconductive materials require low temperatures and the removal of any additional heat sources reduces the amount of liquid nitrogen, or other coolant, needed to maintain the superconductors at their operating temperature. A ring-shaped insulating Dewar lid 85 is provided as a heat shield for the superconductive magnets 84a and the coolant or cryogen 27 surrounding the magnets, as will be discussed later. The energy storage system of the invention, including the chamber 24, is preferably housed within a surrounding containment housing, for example, a concrete jacket 26 (walls shown partially) of sufficient strength to withstand the disintegration of the flywheel and subsequent failure of the vacuum enclosure, in the event of a catastrophic high speed structural failure of the flywheel.

Figure 4:
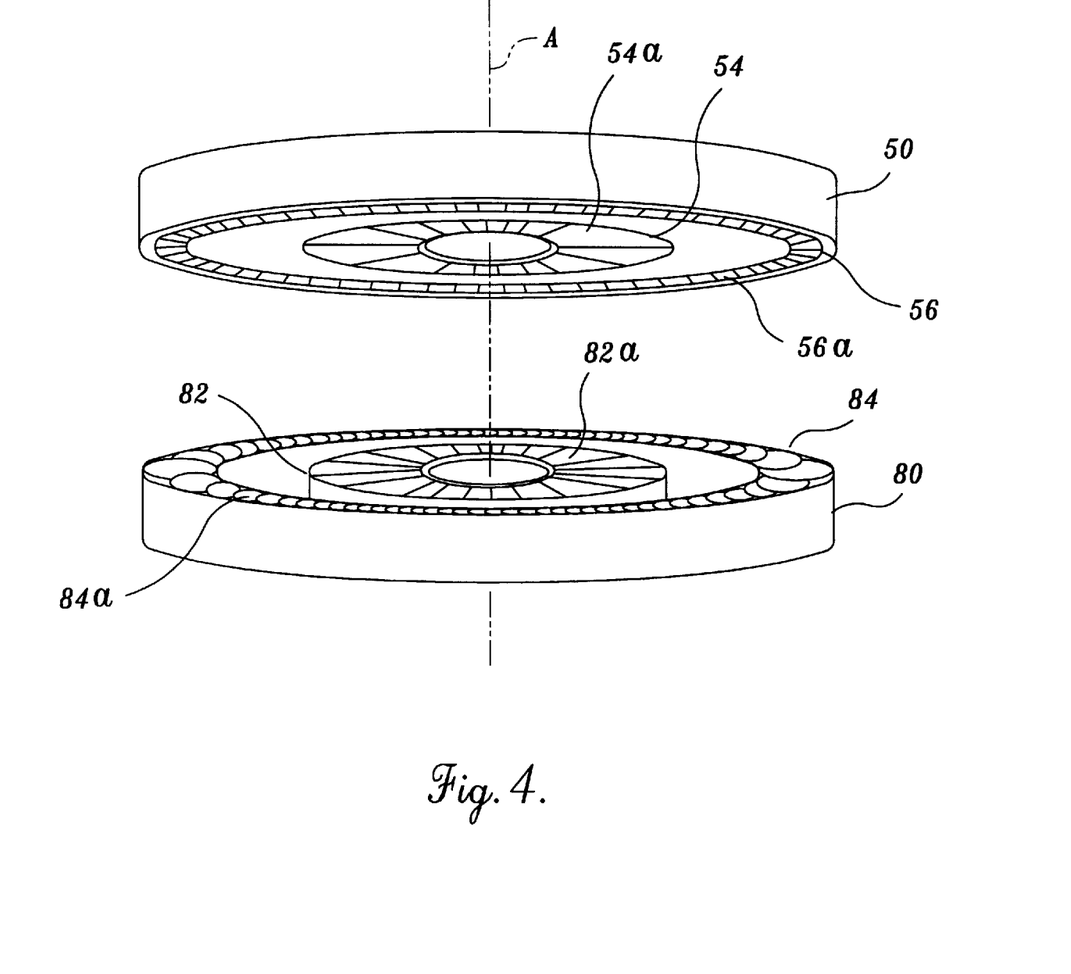
FIG. 4 is a schematic perspective view illustrating an embodiment of the bearing hub and stationary support of the flywheel system of the invention.

In order to reduce friction and increase the proportion of energy recoverable from the flywheel energy storage system of the invention, magnetic bearings are preferred. Thus, an embodiment of the spoked flywheel is equipped with a centrally mounted cylindrical bearing hub 50 that includes a circular face portion 52 in which is disposed two concentric circular troughs 53, 55, as shown in FIG. 3 and FIG. 4. In each of the innermost 53 and outermost 55 troughs is disposed a circular array 54 and 56, respectively, of alternating rings of individual wedge-shaped radially polarized permanent magnets 54a and 56a with their narrow ends directed toward a central axis of the hub. The innermost magnets have magnetic fields of such strength that, when they react with fields of like polarity, they provide a repelling force sufficient to lift the bearing hub 50 and the supported flywheel and spoke structure. The outermost magnets are radially polarized and have fields of such strength that, when they react with the bulk superconductors in the stationary support 80, they provide sufficient lateral and vertical force to rotationally stabilize the wheel.

In order to maintain the flywheel in a levitated condition, the invention provides, in one embodiment, a cylindrical stationary support 80, preferably having a diameter approximately corresponding to the diameter of the bearing hub 50, as shown in FIG. 4. The support 80 has an innermost circular trough 82 wherein is disposed a magnetic ring made up of a circular array of wedge-shaped radially polarized magnets 82a, with narrow ends of the wedges directed toward a central axis of the hub. Concentric with the innermost trough is an outermost trough 84 wherein is disposed a series of high temperature bulk superconductive magnets 84a. In order to provide primary lift for the hub and flywheel structure, the magnets 82a of the inner circular array of the stationary support are permanent magnets with opposite poles on horizontally opposed faces to produce radially polarized magnetic fields that interact with and are repelled by the fields of the permanent magnets 54a of the inner circular array of the hub when the bearing assembly is in use. The superconductive magnets 84a of the outer concentric array are, however, superconducting magnets, which are designed so that, when the bearing hub is assembled vertically above the support, with its central axis A coincident with that of the support, as shown, they interact with the fields of the permanent magnets 56a in the outer concentric ring of the bearing hub to provide not only some lift but, more importantly, lateral and rocking stability to the flywheel. Thus, when the flywheel rotates, any natural tendency of the wheel to rock or move laterally will be counteracted by stabilizing forces that arise from the interaction of the magnets of the outer circular array of the bearing hub with the superconducting magnets of the stationary support.

The arrangement of magnets in the troughs of the bearing stationary support may be reversed, with superconductive magnets in the innermost trough and permanent magnets in the outermost trough. However, this is not the most preferred arrangement because it is desirable to keep the greater portion of the overall magnet mass in the rotating hub as close to the axis of rotation of the flywheel as possible. Since a greater magnet mass is required for lift than for centering, the permanent magnets supplying lift are most preferably located near the interior of the hub. Thus, corresponding interactive lift magnets are also located near the center of the stationary support. Consequently, the superconducting magnets are most preferably located near an outer circumferential portion of the support. It is also possible to use more than one ring of permanent or superconductive magnets but single rings are preferred for simplicity, ease of manufacture, and reduced costs.

In another important aspect of the invention, the superconductive magnets are preferably formed from a bulk high-temperature superconductor that has adequate superconductive properties at the operating temperature to provide lateral and rocking stability. The most preferred bulk superconductive material is $YBa_2Cu_3O_{7-x}$. A preferred bulk superconductive material has a superconductive transition high enough in temperature to permit satisfactory operation with a cost-effective cryogen or coolant. For example, a superconductive composition with a transition at about 92 Kelvin with operation at or about 77 Kelvin (the boiling temperature of liquid nitrogen) may be used.

The flywheel energy storage system of the invention also includes a motor/generator that supplies energy to the flywheel for storage during periods of low power demand, and retrieves energy from the flywheel when power demand increases, or operates in a mode in which it continuously delivers and extracts energy to maintain voltage and phase stability.

According to the invention, an "axial gap" motor/generator is preferred, however other magnetic field geometries, such as the Halbach array, can also be used. In the axial gap type of motor/generator, permanent magnets are grouped in at least two vertically (or "axially") separated, coaxial circular arrays with electrical coils disposed in the space ("axial gap") between the arrays so that, when the flywheel rotates at high velocity and rotating components expand radially outward due to centrifugal loads, the vertical spacing or axial gap between the arrays of permanent magnets is not significantly affected. Thus, the efficiency of the motor/generator does not vary with flywheel velocity due to gap growth, as would be the case if the permanent magnets were so juxtaposed relative to each other that the gap between the arrays of magnets increased with increasing flywheel velocity.

Figure 5:
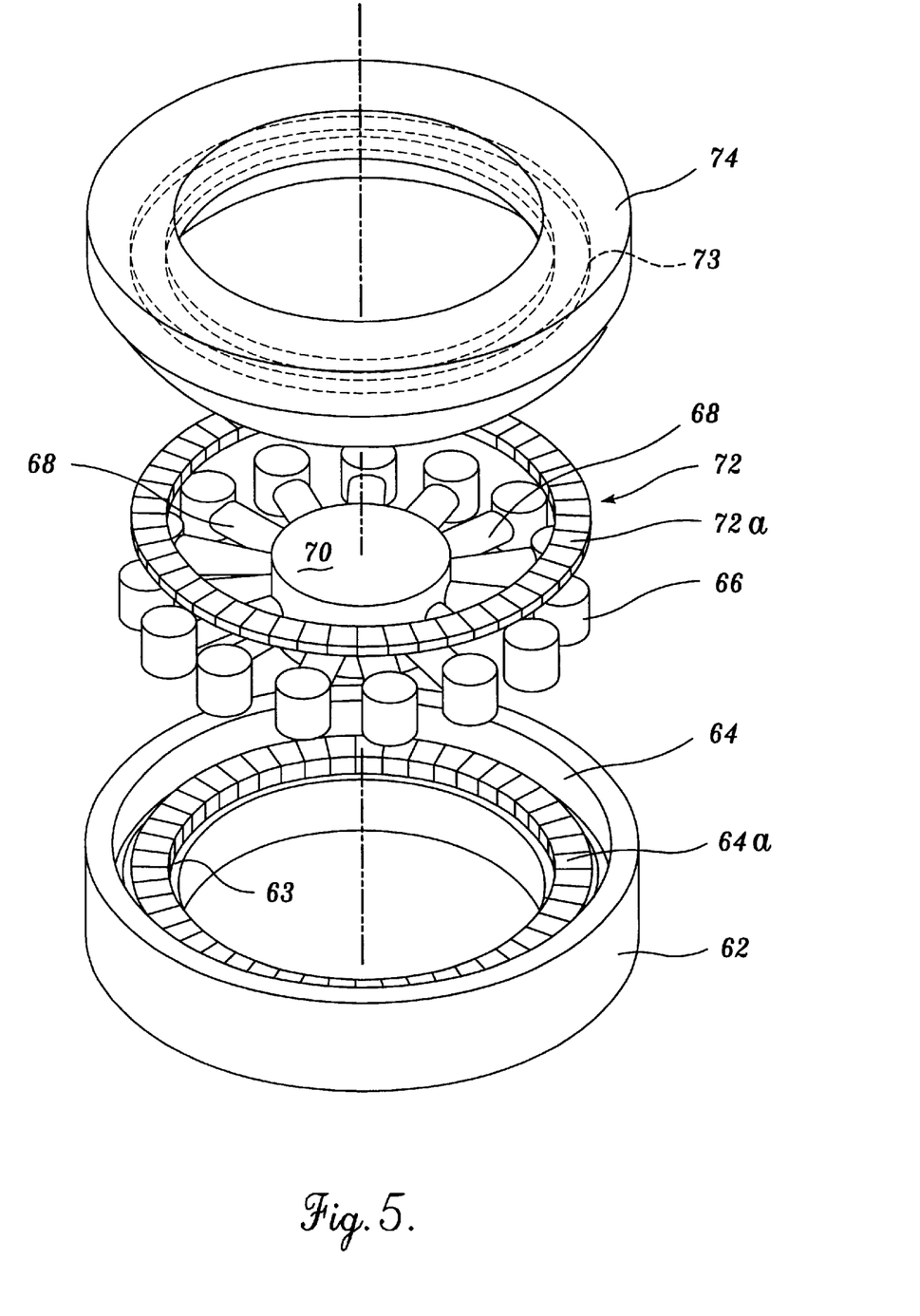
FIG. 5 is an exploded schematic showing important parts of an embodiment of a motor/generator hub according to the invention.

Referring to FIG. 5, which shows a schematic of an embodiment of the motor/generator in an exploded view, the motor/generator 60 includes a retaining ring 62 forming a lower housing portion of the hub, a cooperating ring-shaped upper housing portion 74 having a central bore for passage of a drive shaft, and a cylindrical central hub 70 with associated motor generator coils located inside the housing between the upper and the lower portions, and concentrically with said portions. A nonrotating shaft 21 (not shown in FIG. 5) has an end fixedly mechanically coupled to an upper surface of the central hub and extends axially through the upper housing portion so that the other end of the shaft is mechanically coupled to a motor/generator support 61. See FIG. 2, for example. As shown in FIG. 5, the retaining ring 62, preferably made of aluminum or other inexpensive nonmagnetic material, has an internal circumferential trough 63 for retaining a first circular array of wedge-shaped permanent magnets 64 in a shrinkfit with narrow ends of the wedges directed toward a central axis of the ring. To achieve the shrinkfit, the aluminum ring is first heated and the individual permanent magnets 64a are placed in the circular trough so that, upon cooling, differential rates of contraction between the magnets and the aluminum will result in a tight shrinkfit of the magnets in the circular trough.

A series of motor/generator coils 66, fabricated of windings of electrically conductive wire, as is conventional, are normally stationary within the motor/generator hub, and are located at ends of equal-length radial spokes 68 extending from a central hub 70.

The upper housing portion 74, which cooperates with the ring, has a circumferential trough 73 (shown in dashed lines) in FIG. 5 wherein is disposed a second circular array of wedge-shaped permanent magnets 72 with narrow ends directed to a central axis of the housing portion. The second array of magnets 72 is likewise preferentially held by shrinkfit in trough 73 of the upper housing portion 74. The housing portion cooperates with retaining ring 62 to form a housing for the magnet arrays and coils. Thus, as assembled, the second circular array has a common axis A with the first circular array and is axially spaced from and above the first circular array, with the motor/generator coils interposed between the arrays.

In particularly preferred embodiments, the circular arrays of permanent magnets in the flywheel bearing, stationary support, and motor/generator are made up of individual magnets alternating with a high magnetic permeability material to control magnetic drag in the bearing and maximize torque in the motor/generator. In the specification and claims, a "high magnetic permeability material" is one that has a permeability ratio from about 10 to about 1,000,000. In general, according to the invention, the bearing magnetic field must be as uniform as possible circumferentially around the circular arrays of magnets (azimuthal uniformity) to minimize drag.

Figure 6:
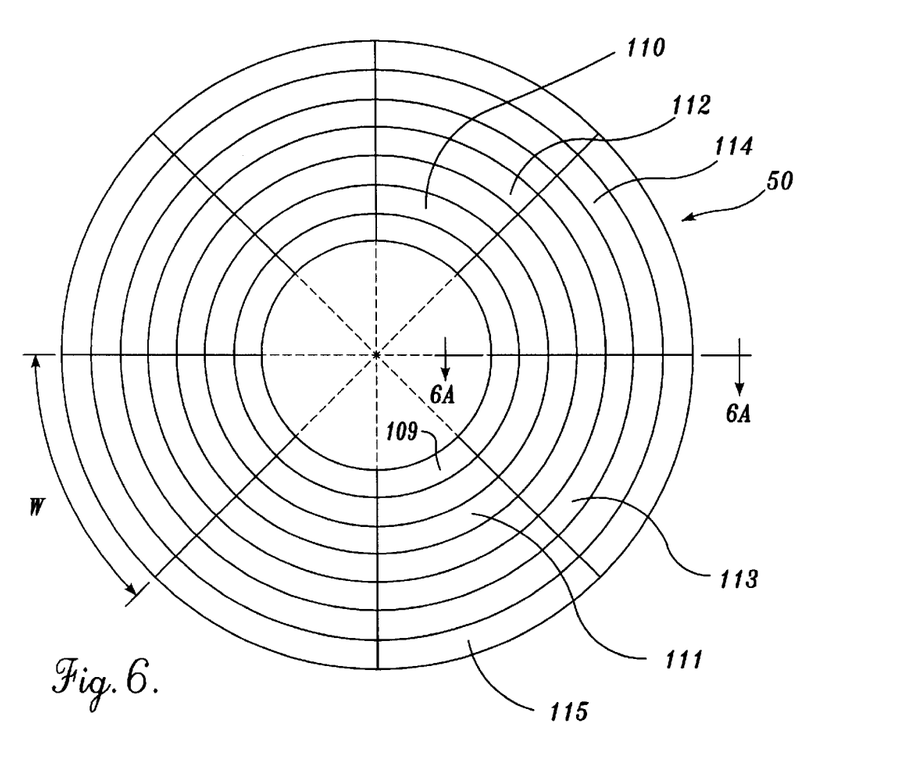
FIG. 6 is a plan view of alternating circular rings of permanent magnets and high magnetic permeability material of an embodiment of a bearing hub, according to the invention.
Figure 6A:
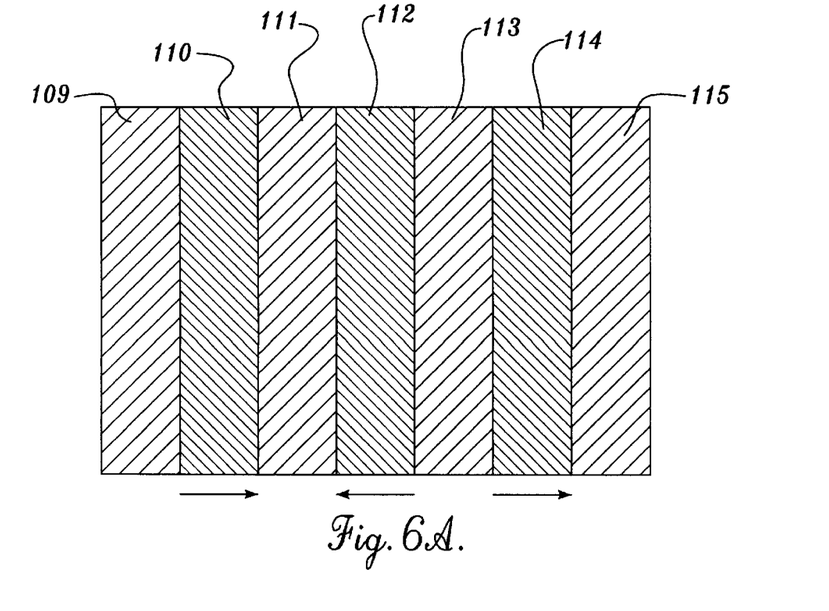
FIG. 6A is a section, taken at A—A of FIG. 6, showing the alternating rings of radially polarized magnets and high permeability material.

A high degree of field uniformity is achieved in the bearing gap, according to the invention, by polarizing concentric rings (that may be either solid continuous rings or rings made up of discrete segments of rings) of permanent magnets of the bearing assembly radially, and surrounding the rings of magnets, inside and outside, by rings (that are also either continuous concentric rings, or made up of discrete segments of concentric rings) of a high magnetic permeability material, that touch the magnets and direct the magnetic field anally into the space between pole faces. Thus, in the embodiment illustrated in FIG. 6, the bearing hub 50 has three concentric rings, 110, 112, 114, of permanent magnets with alternating touching rings 111, 113 of high permeability material between each magnet ring, as well as in an innermost ring 109 and in an outermost ring 115. Each of the magnetic rings is radially polarized (i.e., the polarity of the narrow end of the wedge is opposite to that of the opposite wider end) and is oppositely polarized relative to its nearest neighboring ring, as conventionally indicated by the arrows on FIG. 6A. Thus, proceeding radially outward from the center of the hub 50, a successive ring of magnets encountered has opposite polarity to its preceding ring. This, together with the intervening high-permeability rings produces a substantially azimuthally uniform high field strength horizontal magnetic field in the bearing gap. Also, in the embodiment illustrated, the successive alternating rings are each made up of wedge-shaped segments W that cooperate to form the circular magnetic hub.

Figure 7:
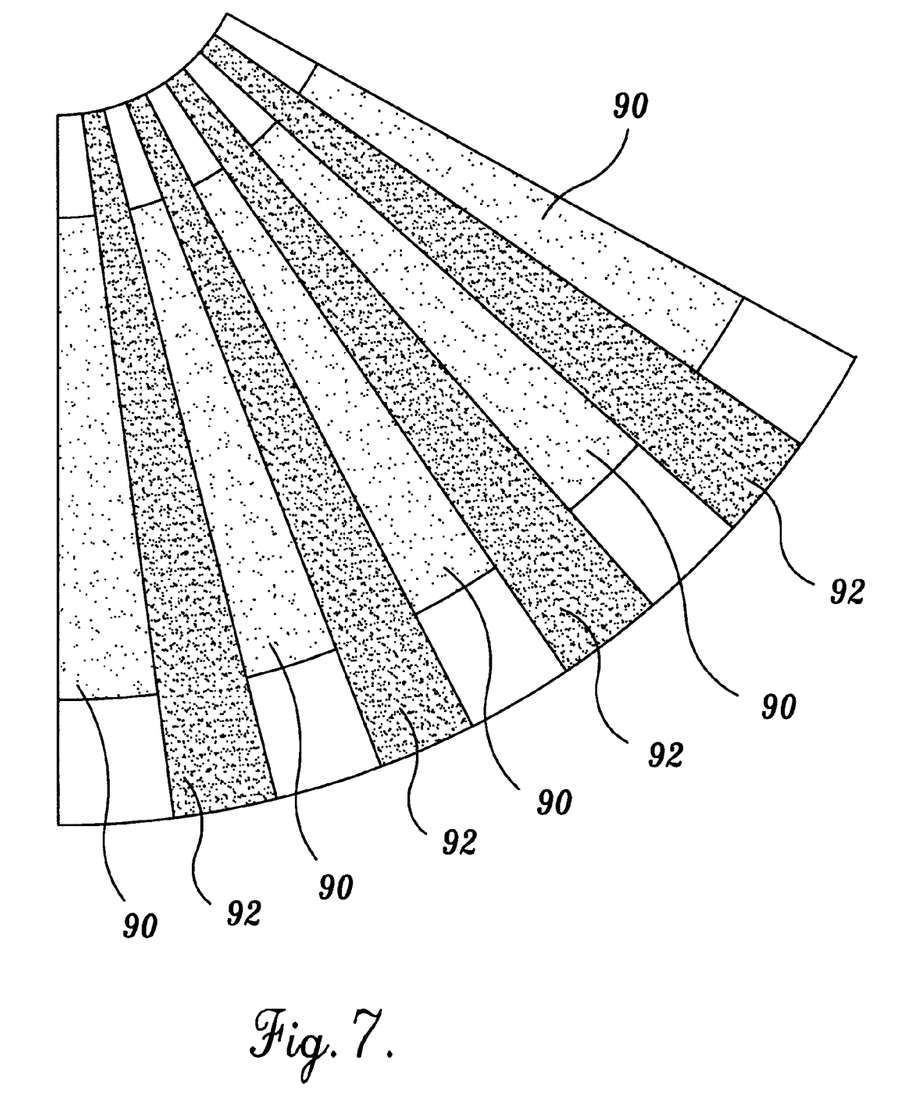
FIG. 7 is a schematic plan view of a portion of an embodiment of a motor/generator of the invention showing radially extending wedge-shaped magnets alternating with wedges of high permeability material in a circular array.

High field strength in the motor/generator gap is similarly achieved by combining high permeability material with permanent magnets. However, in the motor/generator the permanent magnets and high permeability material preferably alternate in wedge-shaped segments to form a circular array around the axis of the circular generator. Thus, as shown illustratively in a partial plan view in FIG. 7, in one embodiment the axially spaced circular arrays of motor/generator magnets, described in detail above, include alternating wedge-shaped segments 90 of permanent magnets with high permeability wedges 92 in touching relationship with and disposed between the magnets.

The invention also provides a method and apparatus for manufacturing composite flywheels that may be used as energy storage devices. The winding device allows the consolidation of a ply of high strength fibers impregnated with a thermoplastic resin to previously consolidated plies to form a flywheel. In the embodiment shown in FIG. 8, the composite flywheel winding machine 120 has a rectangular platform 130 with a tape supply reel 132 vertically and rotatably mounted thereon so that tape 133 on the reel is dispensed as the reel is rotated. The tape is made of longitudinal high strength fibers, oriented parallel to the length of the tape, and coated or impregnated with a thermoplastic resin.

Figure 8:
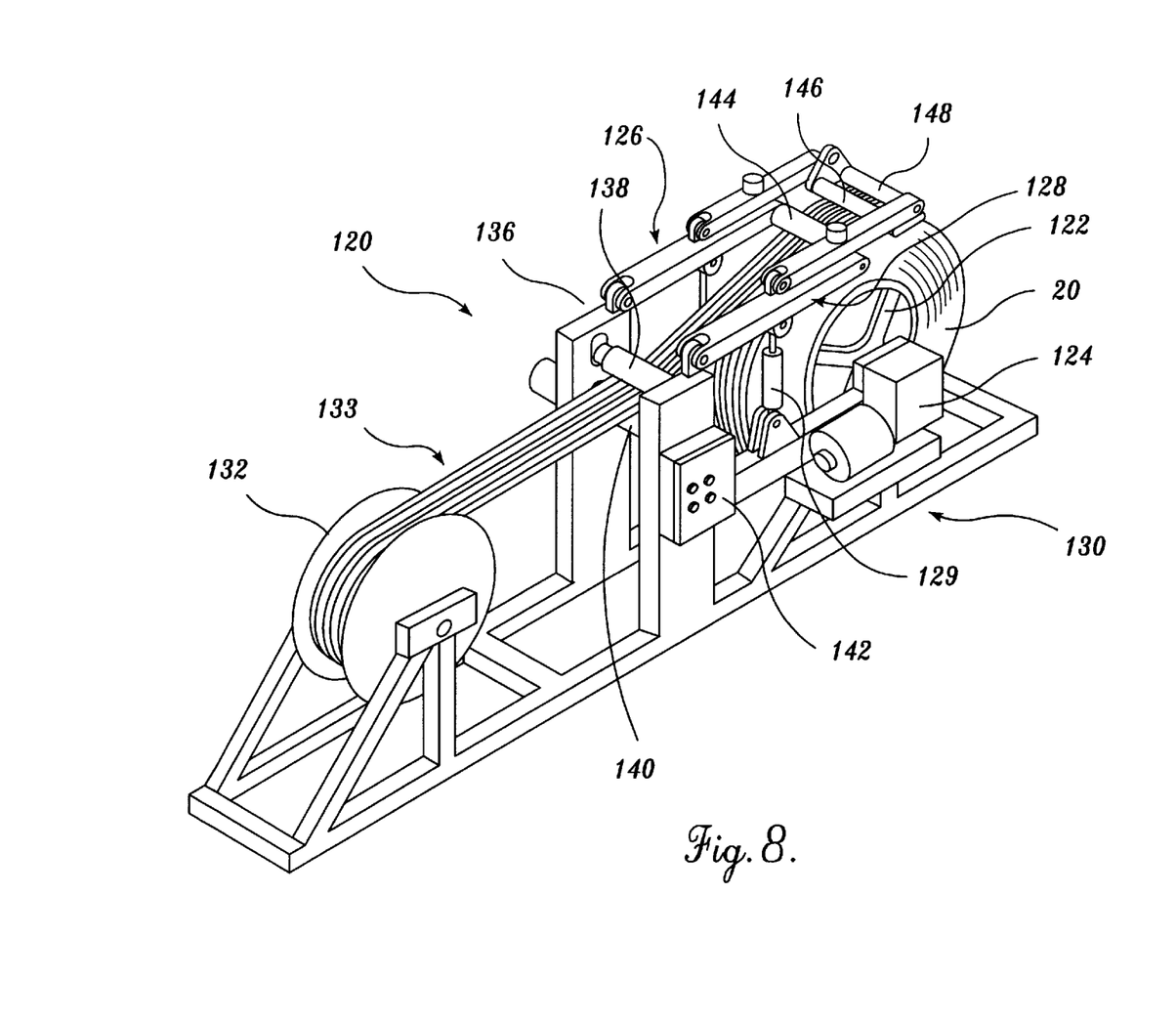
FIG. 8 is a schematic perspective view of an embodiment of an apparatus for making flywheels of the invention.

In the composite flywheel winding machine 120, tape 133 from the supply reel 132 is guided through a tape tension control drive 136 mounted on the platform 130 in front of the tape supply reel. The tape tension control drive includes at least two horizontal cylindrical rollers 138, 140 spaced so that tape is guided, under tension, between the rollers, one of which has an axis coupled to and driven by a motor 142 to control tape tension. The tape exiting from the tension control drive is wound around a cylindrical-shaped mandrel 122 rotatably mounted on the platform 130 ahead of the drive 136. The mandrel 122 has an axial width at least as wide as the tape and has an outside diameter that conforms to the size of the desired inside diameter of the flywheel to be produced. The mandrel is controllably rotated by a motor 124 so that tape is circumferentially wound onto the outer surface of the mandrel at a controlled rate. In order to consolidate the preimpregnated fiber tape around the mandrel to form a circumferentially wound composite, heat must be supplied to the tape to melt the thermoplastic and thereafter heat must be removed to solidify the thermoplastic into a consolidated laminate. Thus, the winding machine has downwardly urged horizontal lever arms 126 and 128 mounted on the platform 130 and extending on either side of the mandrel 122 with horizontal rotatable cylindrical rollers disposed between the levers to make rolling contact with upper surfaces of tape prior to winding onto the mandrel. The levers are downwardly urged by a controlled biasing mechanism 129, such as a hydraulic strut or a biasing spring, to provide a predetermined pressure by the rollers on the tape being wound onto the mandrel. The first of the cylindrical rollers 144 is a heated roller, which applies sufficient heat to the upper surface of the tape to cause the thermoplastic resin of the tape to become softened to the point that it will adhere to other resin. The second roller 146 is located to apply pressure to the upper surface of the tape forcing the tape toward the outer surface of the mandrel and causing softened resin to diffusion bond with resin of circumferentially wound tape on the mandrel. A third roller 148 is a cooling roller that removes heat from the heated tape allowing the thermoplastic resin to solidify the circumferentially wound tape into a continuous composite ring 20.

An embodiment of the composite winding device of the invention is able to wind tape at a rate of approximately twenty inches per second. Thus, the device is able to make a 15,000-pound composite flywheel in about sixteen hours using graphite tape and polysulfone. Such a composite ring has an overall diameter of about 11 feet and a radial width of about 18 inches, and is about 39 inches in vertical height. When rotated at 7,000 revolutions per minute, a flywheel according to the invention using such a ring can store about 1 megawatt-hour of energy. The invention also encompasses winding devices of other sizes and capabilities, for instance, for making flywheels, ranging in storage capacity from as little as 2 kilowatt-hours to 2 megawatt-hours or more.

Because of the unique design of the flywheels of the invention, the only critical frequency a 1 MW-hr flywheel has to negotiate is at about 1 Hz on initial spin-up. This is well below the normal operating range of frequencies of the flywheel so that the flywheels of the invention are free of imbalance resonant responses caused by an approach to critical frequency during the normal operation.

In order to start up the flywheels of the invention, it is preferred that a mechanical bearing is initially used until the flywheel rotates at a speed greater than 1 Hz. Thus, the superconductive magnet is not utilized or energized at startup, so that any lateral movements of the flywheel caused by approaching, encountering, and passing through the critical frequency of the flywheel are not imprinted in the magnetic memory of the superconductor—a condition that could adversely affect the stabilizing influence of the superconductive magnet on any lateral movement of the flywheel.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A motor/generator hub for use with an energy storage flywheel, the motor/generator comprising:

(a) a first circular array of wedge-shaped spaced permanent magnets with wedge-shaped bodies of high magnetic permeability composition interposed in spaces between the magnets, wherein each wedge-shaped body of high magnetic permeability composition is spaced in non-touching relationship to each other wedge-shaped body of high magnetic permeability composition due to the interpositioning of the wedge-shaped permanent magnets, the magnets of the first circular array being oriented such that narrower ends of the magnets are nearer a center of the hub than wider ends of the magnets;

(b) a second circular array of wedge-shaped spaced permanent magnets with wedge-shaped bodies of high magnetic permeability composition inserted in spaces between the wedge-shaped magnets, wherein each wedge-shaped body of high magnetic permeability composition is spaced in non-touching relationship to each other wedge-shaped body of high magnetic permeability composition due to the interpositioning of the wedge-shaped permanent magnets, the magnets of the second circular array being oriented such that narrower ends of said magnets are nearer the hub than wider ends thereof, said second circular array having a common axis with the first circular array and being spaced axially from the first circular array by an axial gap to produce a cooperating magnetic field in the axial gap between vertically spaced opposed magnets of the first and second arrays; and (c) a plurality of coils of electrically conductive wire disposed in the axial gap and magnetic field between the first and second circular arrays.

2. The motor/generator of claim 1, wherein the plurality of coils are radially equidistantly spaced from a central hub common to said plurality of coils.

3. The motor generator of claim 1, wherein the plurality of coils are radially spaced from a common central hub.

4. The motor/generator of claim 1, further comprising a housing, said housing comprising cooperating first and second housing portions, said first housing portion having a first circular non-ferrous trough, the first circular array being disposed and held fixedly in said trough; the second housing portion having a second circular non-ferrous trough, the second circular array being disposed in said second trough and held fixedly therein.

5. The motor/generator of claim 4, wherein the plurality of coils are radially equidistantly spaced from a central hub common to said plurality of coils.

6. A system for storage of energy for subsequent release upon demand, the system comprising:

(a) a stationary support comprising:

(i) a plurality of cylindrical superconductive magnets fixedly arrayed in a first circular array in the support; and (ii) at least one permanently magnetized ring, fixedly disposed in a second circular array of the support, the second array being concentric with the first array, the first circular array having a larger inner diameter than an outside diameter of the second array, the permanently magnetized ring having radially spaced apart magnetic poles;

(b) a bearing hub adapted for attachment to spokes of a flywheel, the hub containing a first permanently magnetized hub ring and a second permanently magnetized hub ring concentric with the first hub ring, the hub having an axis of rotation that coincides with a center of the first and second circular arrays of the support;

whereby a magnetic field of the first concentric ring of the hub interacts with a magnetic field of the at least one permanently magnetized ring of the support to levitate the bearing hub above the support, and a magnetic field of the superconductive magnets of the support maintains the bearing hub in substantially fixed lateral relationship with the support, when the bearing hub rotates about the axis of the hub and the support; and (c) a motor/generator comprising a retaining ring further comprising at least one nonferro-magnetic housing, said housing containing a first circular array of wedge-shaped permanent magnets and a second circular array of wedge-shaped permanent magnets, coaxial with the first circular array, each of said arrays held in place by shrink-fit mechanical forces in the nonferro-magnetic housing.

7. The system of claim 6, wherein the hub comprises a plurality of permanently magnetized concentric rings.

8. The system of claim 7, further comprising rings of high magnetic permeability material interposed between the plurality of concentric permanently magnetized rings.

9. The system of claim 8, wherein the at least one permanently magnetized ring of the stationary support comprises a plurality of concentric permanently magnetized rings each of said rings comprising wedge-shaped permanent magnets.

10. The system of claim 9, further comprising rings of wedged-shaped high permeability material interposed between the plurality of concentric permanently magnetized rings of the stationary support.

11. The system of claim 6, wherein the stationary support comprises at least one ring of high permeability material concentric with, and adjacent to, the at least one permanently magnetized ring.

12. The system of claim 11, wherein the at least one permanently magnetized ring of the stationary support comprises a plurality of wedge-shaped permanent magnets.

13. The system of claim 12, wherein the permanently magnetized rings of the bearing hub comprise a plurality of wedge-shaped permanent magnets.

14. The system of claim 6, wherein the at least one permanently magnetized ring of the stationary support comprises a plurality of wedge-shaped permanent magnets.

15. The system of claim 14, wherein the at least two permanently magnetized rings of the bearing hub comprise a plurality of wedge-shaped permanent magnets.

16. The system of claim 15, wherein individual permanent magnets in each of the concentric rings of the stationary support are polarized such that magnets of said rings, aligned along a common radius of the support, have alternating polarity.

17. The system of claim 14, wherein individual permanent magnets in each of the permanently magnetized rings of the stationary support are polarized such that the magnets of said rings, aligned along a common radius of the support, have alternating polarity.

18. A system for storage of energy for subsequent release upon demand, the system comprising:
(a) a stationary support comprising:
  (i) a plurality of cylindrical superconductive magnets fixedly arrayed in a first circular array in the support; and
  (ii) at least one permanently magnetized ring, fixedly disposed in a second circular array of the support, the second array being concentric with the first array, the first circular array having a larger inner diameter than an outside diameter of the second array, the permanently magnetized ring having radially spaced apart magnetic poles; and
(b) a bearing hub adapted for attachment to spokes of a flywheel, the hub containing a first permanently magnetized hub ring and a second permanently magnetized hub ring concentric with the first hub ring, the hub having an axis of rotation that coincides with a center of the first and second circular arrays of the support;

whereby a magnetic field of the first concentric ring of the hub interacts with a magnetic field of the at least one permanently magnetized ring of the support to levitate the bearing hub above the support, and a magnetic field of the superconductive magnets of the support maintains the bearing hub in substantially fixed lateral relationship with the support, when the bearing hub rotates about the axis of the hub and the support.

* * * * *